J. J. MAGUIRE.
SUPPLEMENTARY SPRING AND MOUNTING THEREFOR.
APPLICATION FILED AUG. 4, 1913.
1,145,841.
Patented July 6, 1915.
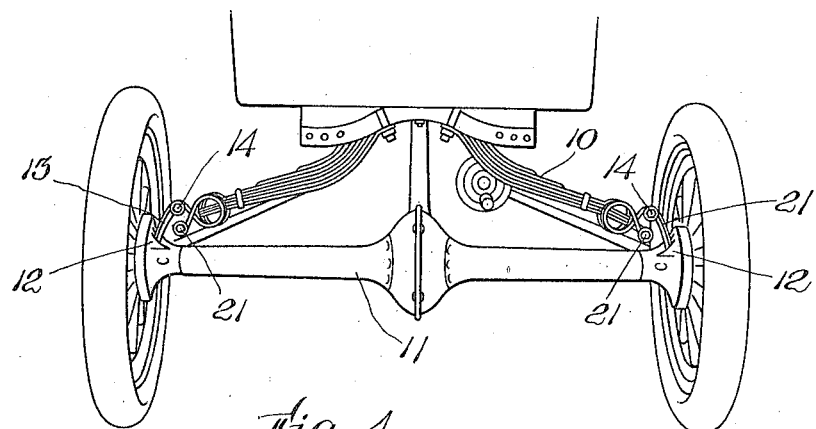
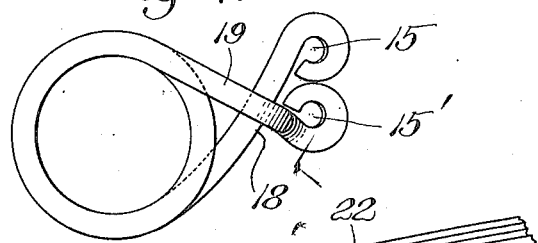
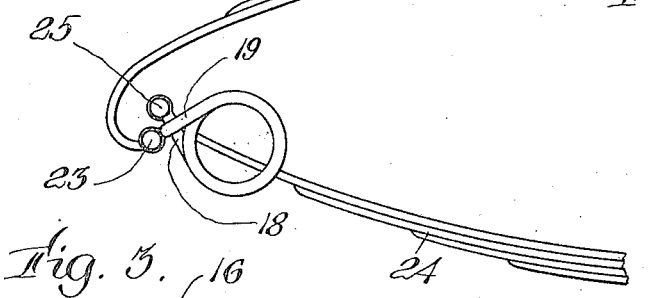
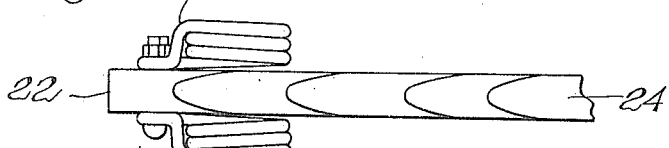
Witnesses:
Louise A. Jordan
Margaret Reardon
Inventor:
James J. Maguire,
by Clyde L. Rogers
his Attorney.

UNITED STATES PATENT OFFICE.

JAMES J. MAGUIRE, OF BOSTON, MASSACHUSETTS.

SUPPLEMENTARY SPRING AND MOUNTING THEREFOR.

1,145,841.  Specification of Letters Patent.  Patented July 6, 1915.

Application filed August 4, 1913. Serial No. 782,814.

*To all whom it may concern:*

Be it known that I, JAMES J. MAGUIRE, a citizen of the United States, and resident of Boston, county of Suffolk, State of Massachusetts, have invented an Improvement in Supplementary Springs and Mountings Therefor, of which the following description, in connection with the accompanying drawings, is a specification, like characters on the drawings representing like parts.

The present invention relates to supplemental springs adapted to be applied to vehicles such as automobiles for coöperation with the main leaf springs to contribute further resilient action particularly by taking up small shocks and jars owing to the instant and sensitive responsiveness of the improved type of spring employed. An efficient spring of this general character is shown in the patent to Bishop, No. 956,033, patented April 26, 1910 and the present form of spring is in certain aspects an improvement on the type there shown. In the spring of the present invention like that shown in said Bishop patent, the spring is equipped with arms extending out in the same general direction and provided with eyes arranged in the same vertical plane for receiving operative connections.

One prime object of the invention is to provide an improved form of spring of the type in question wherein the securing arms instead of extending normally in diverging relation as shown in said patent, are crossed so that the eyes as the spring is placed under tension move apart instead of moving nearer together. This arrangement permits the spring to be made in a much neater, and more compact form, with the securing eyes normally quite close together and only being considerably separated when a load is placed on the spring. A further important beneficial result of the present improved cross arm type of spring is that since the securing points, *i. e.*, the two eyes are normally quite close together instead of being relatively far apart, the injurious effects of side racking strains are minimized since the same are exerted through a relatively small leverage.

A further feature of the invention has to do with an improved arrangement of mounting for a supplemental spring of the type in question for use with a special form of vehicle construction.

The above and other objects and features of the invention will be better understood from the following detailed description taken in connection with the accompanying drawings and will be thereafter pointed out in the appended claims.

Referring to the drawings: Figure 1 is an elevation showing the rear of the lower portion of a vehicle with my improved springs mounted thereon in accordance with my invention; Fig. 2 is an elevation showing the manner in which my improved springs are applied to an ordinary elliptical leaf spring construction; Fig. 3 is a plan view thereof; Fig. 4 is an elevation of one of my improved springs removed.

In Fig. 1 the invention is shown as applied to a type of vehicle wherein only upper leaf springs are employed. These leaf springs are here indicated at 10, the vehicle being shown at 11 equipped at each end adjacent the wheels with seats 12 for receiving the spring mounting. Each of these seats is adapted to receive a perch or strut piece 13 and in accordance with the improved manner of mounting of the supplemental spring of the present invention each of these perches is engaged at its top as at 14 with the upper eyes 15 of the improved supplemental springs. In accordance with the invention these springs consist of right and left side elements 16, 17, each of said elements being formed with a plurality of convolutions and having its extremities extended in arms 18, 19 which cross quite close to the convolutions and being formed at their ends with upper and lower eyes 15 and 15' respectively. To permit the right and left side member of the spring device thus formed to lie close to the sides of the leaf springs, the arm projecting from the outer side of the convolutions is in each case bent in as seen at 20 so that the eye carried thereby is in alinement with the other eye, the eyes thus presenting their inner sides in a plane substantially flush with the inner side of the convolution so that these spring elements lie up close and snug to the leaf springs when assembled as seen in Fig. 3.

The present crossed arm construction of supplemental spring is of special value in connection with a mounting of the type seen in Fig. 1, since the connection of the coil springs with the perch at 14 is relatively close to the connection thereof by their lower arms with the leaf springs as at 21, and thus the tendency to racking strains against the perch and between the arms of the spring is largely reduced and the assemblage made more secure than would be possible with the interposition of other forms of supplemental springs, being practically as substantial as a direct connection of the leaf springs to the perches, with the advantage of the greatly increased resiliency and shock absorbing properties imparted by the coil springs.

In Fig. 2 I show my improved supplemental springs applied to an ordinary type of elliptic leaf spring having its upper portion 22 joined to the lower arm of the coil springs 23 and the lower leaf spring portion 24 joined to the upper arms at 25. It will be observed that the relatively compact but at the same time amply resilient cross arm formation lends itself particularly well to an assemblage of this kind, the convolutions projecting inward with the eyes normally quite close together so that the normal relations of the elliptic spring portions are not materially distorted, the two eyes 23, 25 being normally only about as far apart as the usual rigid link connection between these parts, and only becoming materially greater momentarily as the spring acts to take up shocks.

I am aware that the invention can be modified as to specific details without departing from the spirit thereof and I therefore do not desire to be limited to the present illustrative embodiment but refer to the appended claims rather than the foregoing description to indicate the scope of the invention.

Having described my invention, what I claim as new and desire to secure by Letters Patent is:

1. Apparatus of the kind described, comprising a leaf spring adapted to support a vehicle, a vehicle axle, and a supplemental spring formed as a coil having its extremities as crossed arms formed with eyes, the lower one thereof having connection with said leaf spring and the upper one having a perch mounting on the axle.

2. Apparatus of the kind described, comprising a leaf spring adapted to support a vehicle, a vehicle axle and a supplemental spring composed of right and left side parts, each part consisting of a coil with arms extending in the same general direction formed with eyes in the same vertical plane at their extremities, the lower of said eyes having connection with said leaf spring and the upper eyes having a perch mounting on the axle.

3. Apparatus of the kind described, comprising a leaf spring to constitute a vehicle support, a vehicle axle and a supplemental spring formed as a coil with extremities extending in the same general directions and in the same vertical plane, one of said extremities having connection with said leaf spring and the other having a perch mounting on said axle.

In testimony whereof, I have signed my name to this specification, in the presence of two subscribing witnesses.

JAMES J. MAGUIRE.

Witnesses:
GEORGE D. PIKE,
LOUISE A. JORDAN.